J. W. LINBARGER.
PLUMBER'S FITTING.
APPLICATION FILED JAN. 26, 1912.

1,115,696.

Patented Nov. 3, 1914.

WITNESSES
N. V. Walsh
H. M. White

INVENTOR
John W. Linbarger
BY George Bath
ATTORNEY

UNITED STATES PATENT OFFICE.

JOHN W. LINBARGER, OF NEW YORK, N. Y.

PLUMBER'S FITTING.

1,115,696.　　　　Specification of Letters Patent.　　Patented Nov. 3, 1914.

Application filed January 26, 1912. Serial No. 673,683.

*To all whom it may concern:*

Be it known that I, JOHN W. LINBARGER, a citizen of the United States, and a resident of New York, borough of Brooklyn, in the county of Kings and State of New York, have made and invented certain new and useful Improvements in Plumbers' Fittings, of which the following is a specification.

My invention relates to a combined fitting and connection for use with sinks, wash-tubs, etc. Heretofore, it has been the common practice to employ with the inlet water pipe to a sink, wash-tub, etc., a thimble connected up with the said inlet pipe, usually made of lead, by means of a wipe joint, the thimble being of such size or length as to necessitate cutting away the wall or partition for the reception of the pipe, thereby not only involving considerable time and labor, but also to some extent marring or injuring the wall. Furthermore, when such a thimble is used, some means must be employed for closing up the extreme end of the inlet pipe above the thimble, usually by means of a plug or with solder. Again, some means must be employed for securing the pipe within the groove cut into the wall as it oftentimes happens that the fitting must be done in narrow, contracted and inconvenient places, the work involving considerable time, labor and expense. To overcome these objections, I have provided a fitting wherein the necessity of cutting and injuring the wall is avoided, the thimble being made in one integral piece with an inlet to be connected up with the inlet pipe in such a way that the latter may stand out a short distance from the wall. Furthermore, the necessity of closing up the upper end of the inlet pipe by means of a plug or solder is avoided, as is also the necessity for separate straps or means for securing the pipe to the wall, these attaching means being constructed integral with the fitting. As the fitting may be made of a standard size, that is, with the thimble of a standard length, it insures the proper connection of the spigot or bib thereto without any great or considerable labor of fitting the parts together.

With the end in view of overcoming the objections urged against the old form of thimble connection, and of effecting the results as above stated, the invention consists in certain novel features of construction and combinations of parts as will be hereinafter fully described and pointed out in the claim.

Figure 1:
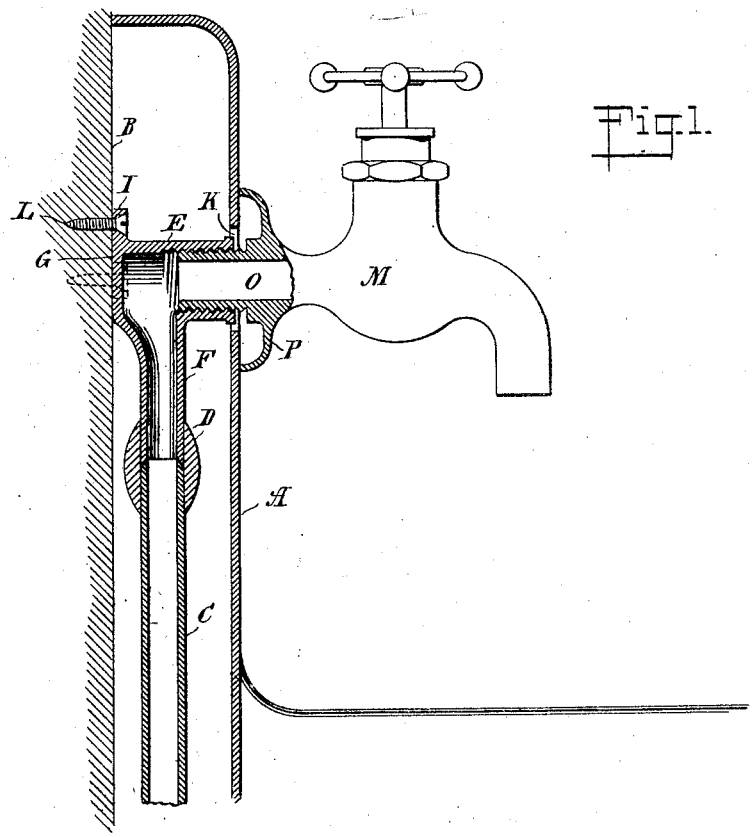
Figure 2:
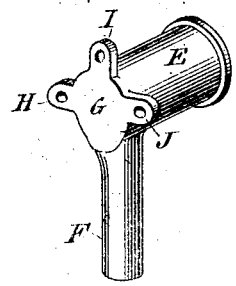

In the accompanying drawings, Figure 1 is a sectional view of my improved combined fitting and connection, as applied to an inlet pipe and with a bib or spigot attached thereto; Fig. 2 is a perspective view of my improved fitting, and Fig. 3 a view in side elevation thereof, showing the fitting provided with an external thread for use in connection with a bib internally threaded.

Referring to the drawings, A represents the back of a sink or tub usually made of metal, and secured to a wall, partition or other support B. Between the back A of the sink and the wall is located an inlet supply pipe C, to the upper extreme end of which is connected, either by a threaded or wipe joint D, my improved combined fitting and connection. This fitting comprises a tube or thimble E, having formed integral therewith and approximately at right angles thereto, the inlet F, the lower extreme end of the latter being connected with the upper extreme end of the inlet pipe C, as before described. In some instances it may be advisable to join the inlet F with the inlet pipe C by means of a threaded connection, particularly where the inlet pipe is made of brass or iron, or when made of lead it might be desirable to connect the pipes by means of a wipe joint, as illustrated in the drawings.

Figure 3:
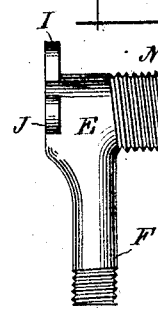

In order to avoid the necessity of cutting or forming a groove or channel in the wall B, and thus injuring the same, for the inlet pipe C, I offset the inlet F with relation to the thimble E, the inlet F being curved inwardly where it joins the rear end of the thimble, as clearly illustrated in Figs. 1 and 3 of the drawings, thus bringing the inlet pipe C into a position with relation to the wall B where the joint D may be conveniently wiped or formed, and offering sufficient room between said joint and the wall B to apply the necessary amount of solder to effect a perfect union of the parts.

The rear end of the thimble E is made in the form of a flat plate G, in order that the same may rest securely against the wall or support B, this plate being formed with the lugs H, I, J, preferably three in number, the upper lug I being centered vertically with the thimble E, and the lugs H and J centered horizontally therewith, in order to facilitate the easy and convenient centering of the fitting both vertically and horizontally, in accordance with the opening K formed in the sink back. Through these lugs or ears H, I, J, are passed the nails or screws L, as illustrated in Fig. 1, in order to assist in holding the parts securely in place to the back or support B.

The thimble E can be made of a standard length, in order to project into the opening K of the back A, and to within a short distance of the outer face or surface thereof, or, if desired, of slightly excessive length, in order to properly fit in place should the back A extend slightly beyond the standard distance from the wall B, and in which the thimble may be filed off to a slight extent, to be properly accommodated in the sink back when the latter extends the proper distance from the wall B.

The thimble may be internally threaded as illustrated in Fig. 1, to be used in connection with a bib or spigot M, externally threaded, or said thimble, as illustrated in Fig. 3, may be externally threaded as indicated at N, to be used in connection with a bib or spigot internally threaded, the pipe O of the spigot being threaded into or onto the thimble until the plate P thereof impinges tightly against the sink back A.

From the foregoing it will be understood that my improved fitting may be connected up with the inlet pipe and spigot in much less time and with much less labor and expense than has heretofore been possible by the means commonly employed, in that its thimble and inlet are in the form of a single casting and no joining thereof necessary; further, because the necessity of soldering, plugging or otherwise closing up the upper extreme end of the inlet pipe is avoided; because the fastening means are already provided on the fitting; further, because the necessity of cutting a groove or channel into the wall is avoided; further, there is but one joint to make, viz., that between the upper end of the inlet pipe and the lower end of the inlet of the fitting; further, because the thimble is always of the proper length to extend into the opening in the sink back, and, finally, because the fitting may be easily and readily centered with relation to said opening in the back. Again, my improved fitting, while cheaper to manufacture than the old form of device, is much neater in appearance, and made of one solid casing, it affords a much stronger and better support for the sink back than in the instance where a thimble is soldered at right angles to the inlet pipe, the fitting itself being secured tightly to the wall instead of the inlet pipe.

What I claim is:—

An article of the character described comprising a thimble with a threaded forward end, and an inlet pipe formed integral therewith and extending at right angles thereto and offset from the closed rear end of said thimble, said rear closed end being provided with a flat face extending at right angles to the horizontal axis of said thimble and provided with integral lugs formed with openings therein vertically and horizontally centered with relation to the vertical and horizontal axis of said thimble.

Signed at New York borough of Manhattan in the county of New York and State of New York this 24th day of January, A. D. 1912.

JOHN W. LINBARGER.

Witnesses:
H. M. White,
A. V. Walsh.